(12) United States Patent
Green et al.

(10) Patent No.: US 6,358,448 B1
(45) Date of Patent: Mar. 19, 2002

(54) APPARATUS AND METHOD FOR RECLAIMING MAKE-UP

(76) Inventors: Loretta V. Green, 302 Easy St., Townhouse C1, Mantoloking, NJ (US) 08738; Edward J. Carlin, 794 5th St., Secaucus, NJ (US) 07094

( * ) Notice: Subject to any disclaimer, the term of this patent is extended or adjusted under 35 U.S.C. 154(b) by 0 days.

(21) Appl. No.: 09/455,112

(22) Filed: Dec. 6, 1999

(51) Int. Cl.⁷ ............................................... B29C 43/02
(52) U.S. Cl. ........................ 264/109; 264/115; 264/911; 425/185; 425/193; 425/318; 425/412; 425/DIG. 32; 425/DIG. 46
(58) Field of Search ................................. 264/109, 115, 264/119, 122, 37.29, 319, 320, 911; 425/182, 185, 193, 318, 406, 410, 412, 803, DIG. 32, DIG. 46

(56) References Cited

U.S. PATENT DOCUMENTS

| | | | |
|---|---|---|---|
| 1,244,096 A | | 10/1917 | Kendall |
| 1,782,076 A | | 11/1930 | Safford, Sr. |
| 2,486,347 A | | 10/1949 | Walker |
| 2,573,141 A | * | 10/1951 | Heinrich ..................... 264/109 |
| 2,900,664 A | * | 8/1959 | Hampel et al. ............. 425/420 |
| 4,035,122 A | | 7/1977 | Cavanaugh |
| 4,655,702 A | | 4/1987 | Hodgson |
| 4,660,608 A | * | 4/1987 | Arai |
| 4,781,564 A | | 11/1988 | Cerrone |
| 4,962,626 A | * | 10/1990 | Gueret |
| 5,039,294 A | * | 8/1991 | Gautier et al. ............. 264/120 |
| 5,211,892 A | * | 5/1993 | Gueret ....................... 264/113 |
| 5,316,712 A | * | 5/1994 | Ono et al. .................. 425/803 |
| 5,520,202 A | | 5/1996 | Arbree |
| 5,897,868 A | * | 4/1999 | Kobayashi et al. |

* cited by examiner

Primary Examiner—Mathieu D. Vargot
(74) Attorney, Agent, or Firm—Arthur Jacob

(57) ABSTRACT

Apparatus and method reclaim make-up of the type ordinarily supplied in block form by processing broken, unusable random-sized pieces of such make-up into a block of usable make-up of prescribed consistency, size and configuration, by advancing the random-sized pieces through a mesh member of selected mesh size to form intermediate particles of a size appropriate for agglomeration into the block of usable make-up. A measured charge of intermediate particles is established in a compression chamber where the measured charge is compressed by a ram into a mold member to form the block. The mold member preferably includes a tray which selectively is removed to a cosmetic case for ease of carrying and using the reclaimed make-up.

24 Claims, 4 Drawing Sheets

APPARATUS AND METHOD FOR RECLAIMING MAKE-UP

The present invention relates generally to the restoration of make-up from an unusable form to a usable form and pertains, more specifically, to apparatus and method for reclaiming broken pieces of make-up ordinarily supplied in block form by reducing the broken pieces to intermediate particles no larger than a selected mesh size and then compressing the particles into a reconstituted block of prescribed uniformity and dimensions, enabling ready transport and use of the reclaimed make-up.

Personal appearance is an issue which has opened very large markets for the sale of cosmetics, health foods, clothing and other items which enable an individual to make a fashion statement. In particular, cosmetics are selected by an individual on the basis of the image projected through the use of those particular cosmetics and, once having chosen a specific cosmetic, the individual is reluctant to accept a substitute. This is especially true when it comes to the choice of a facial cosmetic, among the more popular of which is make-up ordinarily supplied in block form and carried on the person for frequent use throughout the day. Because such make-up is carried about in purses, in pockets, in automobiles and the like, the cosmetic is subjected to a variety of conditions, such as heat, cold and humidity, as well as to physical abuse from rough handling, whether inadvertent or otherwise, usually depending upon the activities in which an individual is involved during the course of a day.

Make-up which ordinarily is supplied in block form is a finely balanced blend which must meet several critical criteria. The make-up must be moist enough to hold together in a block enabling ready use, but must be dry enough not to shine when applied to the skin of an individual. It must be hard enough not to crumble, yet soft enough to enable easy and smooth application. During the life of a block of such make-up, from the time when a new package is opened until the time when the make-up is fully used up, the block ordinarily is subjected to slamming, jostling, dropping and other physical abuse, as well as being subjected to further adverse conditions such as those outlined above. As a result, the block frequently breaks into fragmented pieces, rendering the make-up unusable long before being expended. Merely discarding these pieces is wasteful and expensive, especially since most consumers will not settle for anything less than an exact replacement for the original product.

Most make-up products of the type which are supplied in block form are prepared by blending selected ingredients into a mixture, and then treating the mixture by methods well-known in the cosmetics industry to form an intermediate process product known as a granulation. The granulation then is compressed to force the granules of the granulation to agglomerate and form a solid, uniformly hardened block. The scale of the production of such cosmetic products is very large, requiring enormous outlays for machinery having the size, speed and power necessary to meet large scale production. Other operations, such as quality control, packaging and further handling of the product all contribute to placing the processing of a block-type make-up cosmetic product well beyond that which can be accomplished in a practical manner by an individual user of such cosmetics. However, the finished block of make-up purchased by an individual consumer does contain all of the necessary ingredients, in all the correct proportions, to form an acceptable product. Hence, all that would be necessary to reclaim usable make-up from unusable broken pieces of such make-up is a reconstituting apparatus and process simple enough and practical enough to be operated and accomplished by the individual.

The present invention provides apparatus and method readily available for use by an individual in reclaiming make-up ordinarily supplied in block form by processing random-sized pieces of broken, unusable make-up into a block of usable make-up. As such, the present invention attains several objects and advantages, some of which are summarized as follows: Provides simplified apparatus and method enabling individual consumers to reclaim pieces of broken, unusable make-up of the type ordinarily supplied in block form with ease and economy; enables the ready processing by individuals of random-sized pieces of such make-up into usable blocks of uniformity and dimensions; enhances economy through salvaging previously unusable make-up for further use; allows greater latitude in the choice available to particular consumers concerned with the high cost of cosmetic products which are prone to becoming unusable when exposed to harmful conditions encountered in the field; provides increased versatility in the use of make-up of the type supplied in block form in that greater variety is made available at more reasonable cost; requires only a minimal outlay for simplified, readily portable apparatus easily operated to conduct an effective process without the necessity for specialized tools and training; promotes the use of block-type make-up through reducing waste and concomitant expense; enables the reliable and effective reclamation of make-up which heretofore has been merely discarded as unusable.

The above objects and advantages, as well as further objects and advantages, are attained by the present invention which may be described briefly as apparatus for reclaiming make-up ordinarily supplied in block form by processing broken, unusable random-sized pieces of such make-up into a block of usable make-up of prescribed consistency, size and configuration, the apparatus comprising: a housing; a compression chamber in the housing, the compression chamber having a first end and a second end, and a peripheral chamber wall extending longitudinally between the first and second ends; a processor including a mesh member having a mesh size selected for reducing the random-sized pieces of make-up to intermediate particles no larger than the mesh size and capable of being agglomerated into the block of usable make-up of prescribed consistency; a processor mount for mounting the mesh member on the housing for selective communication with the compression chamber to pass intermediate particles through the mesh member and into the compression chamber to establish a charge of intermediate particles in the compression chamber, and for selective removal from communication with the compression chamber; a mold member having dimensions corresponding to the prescribed size and configuration of the block of usable make-up; a mold holder for holding the mold member in the housing for selective communication with the compression chamber and for selective removal from communication with the compression chamber; and a ram movable longitudinally into the compression chamber, upon removal of the mesh member from communication with the compression chamber, for compressing the charge of intermediate particles passed from the mesh member into the compression chamber to agglomerate the intermediate particles of the charge into the block of usable make-up, with the block placed in the mold member.

Additionally, the invention includes a method for reclaiming make-up ordinarily supplied in block form by processing broken, unusable random-sized pieces of such make-up into a block of usable make-up of prescribed consistency, size and configuration, the method comprising: advancing the random-sized pieces of make-up into a processor juxtaposed with a compression chamber having first and second ends, the processor including a mesh member; prior to advancing the random-sized pieces of make-up into the processor, selecting a mesh size for the mesh member for reducing the random-sized pieces of make-up to intermediate particles no larger than the mesh size and capable of being agglomerated into the block of usable make-up of prescribed consistency; passing the intermediate particles from the processor into the compression chamber to establish a charge of intermediate particles; advancing a ram into the compression chamber to compress the charge of intermediate particles into a mold member having a size and configuration corresponding to the prescribed size and configuration of the block of usable make-up so as to agglomerate the intermediate particles of the charge into the block of usable make-up, with the block placed in the mold member.

The invention will be understood more fully, while still further objects and advantages will become apparent, in the following detailed description of preferred embodiments of the invention illustrated in the accompanying drawing, in which.

Figure 1:
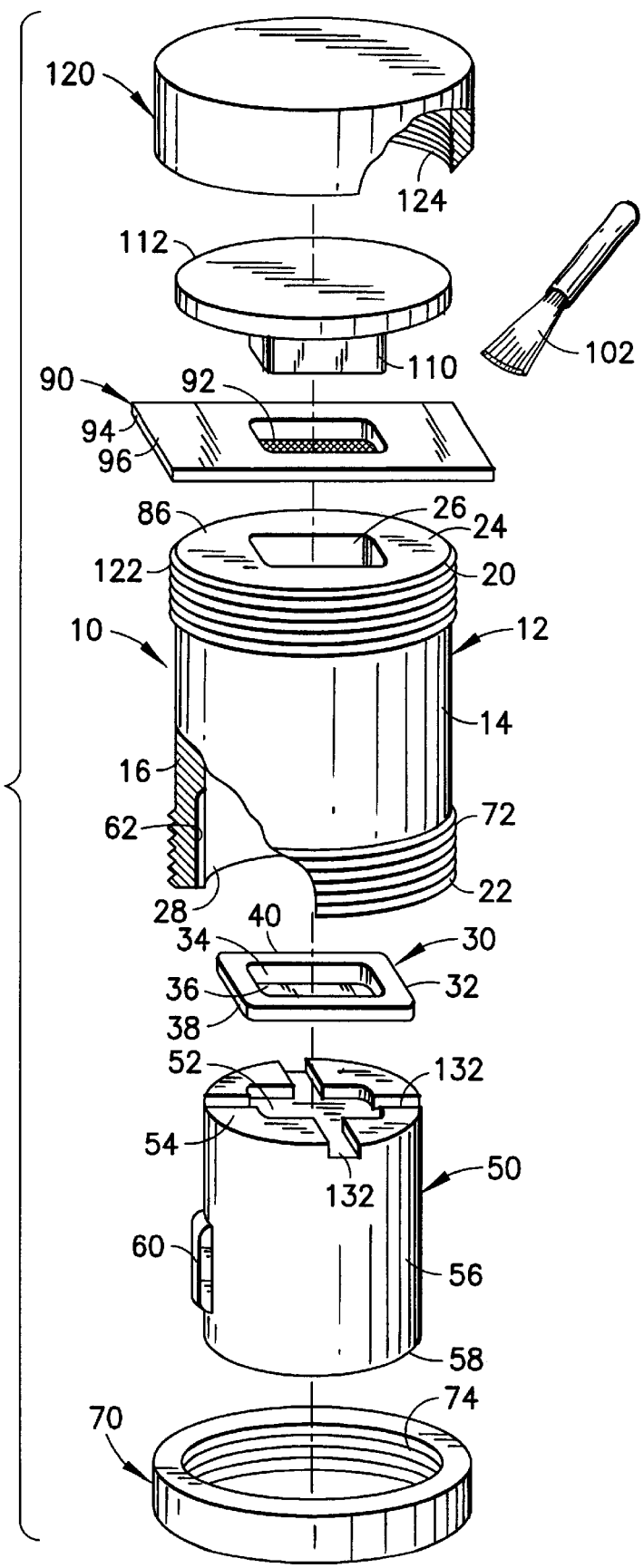
FIG. 1 is an exploded perspective view of an apparatus constructed in accordance with the present invention.

Referring now to the drawing, and especially to FIG. 1 thereof, an apparatus constructed in accordance with the present invention is shown at 10,and is seen to include a housing 12 in the form of a tubular member 14 having a generally cylindrical wall 16 extending longitudinally between a first end 20 and a second end 22. A web 24 spans the cylindrical wall 16 at the first end 20, the web 24 being shown unitary with the wall 16 and having an opening 26 passing axially through the web 24 to communicate with an axially extending cylindrical bore 28 in the housing 12.

A mold member 30 is shown in the form of a tray 32 having a cavity 34 within a base 36 of the tray 32, and a peripheral lip 38 along upper edge 40 of the tray 32. While the configuration of tray 32 is illustrated as including a generally rectangular plan configuration, providing cavity 34 with essentially parallel opposite sides, other configurations are feasible, such as a circle, an ellipse, and the like, depending upon the shape to be molded. A mold holder 50 includes a socket 52 having a configuration and size complementary to the base 36 of the tray 32 so that the tray 32 is receivable within the socket 52 of the mold holder 50 for being held in an accurately located position within the mold holder 50, with the lip 38 resting against upper face 54 of the mold holder 50. Mold holder 50 extends longitudinally downwardly from upper face 54 and includes a generally cylindrical outer surface 56 extending axially to lower face 58 of the mold holder 50 and being complementary to the bore 28 in wall 16 so as to be received slidably within the bore 28. A key 60 extends longitudinally along the mold holder 50, upwardly from the lower face 58, and projects radially outwardly from the outer surface 56 for reception within a complementary keyway 62 in the wall 16 of the housing 12.

Figure 2:
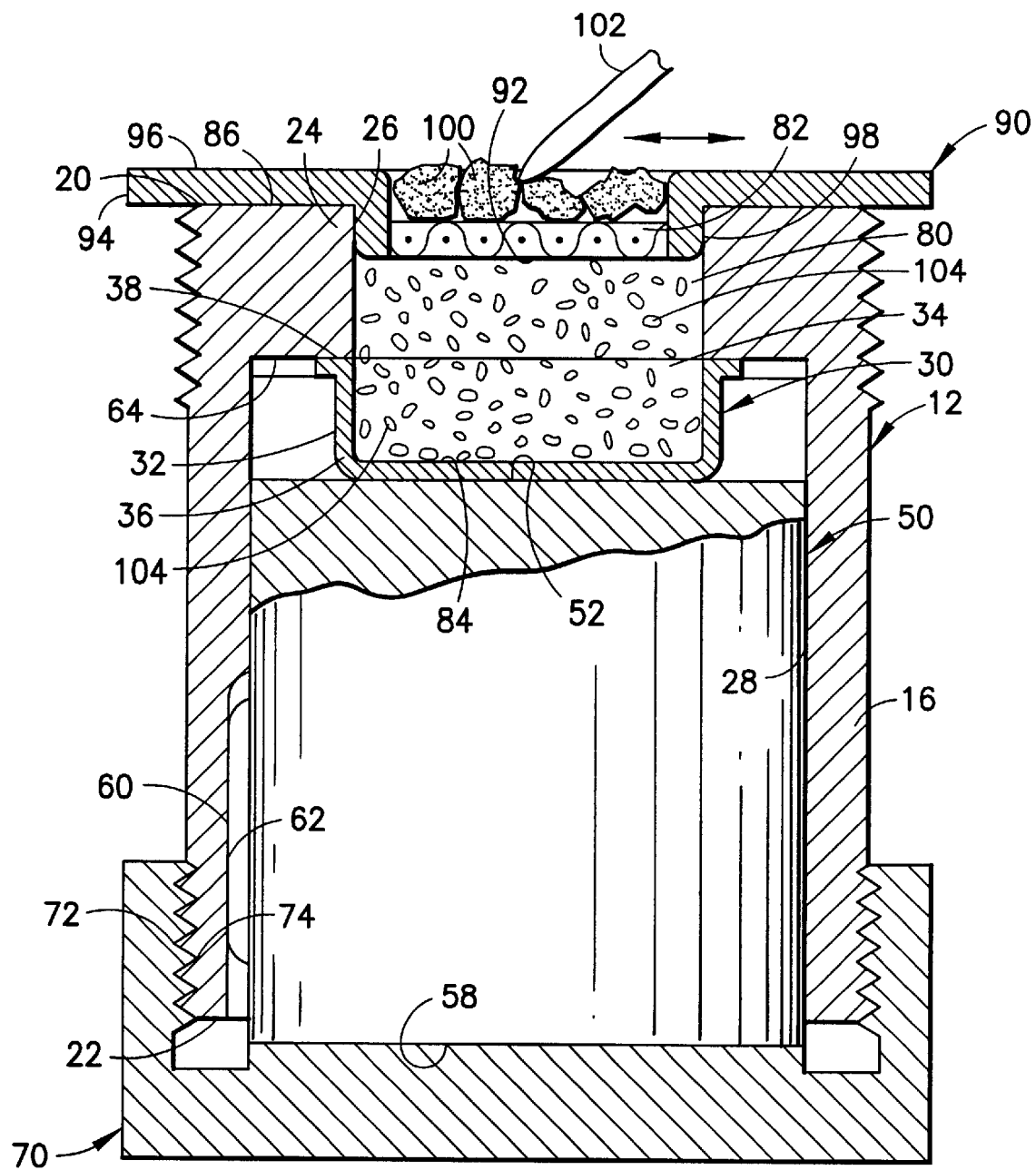
FIG. 2 is a longitudinal cross-sectional view of the apparatus, showing use of the apparatus in conducting a method of in the present invention.

Turning now to FIG. 2, as well as to FIG. 1, with the tray 32 seated in socket 52, the mold holder 50 is inserted into the housing 12, sliding the mold holder 50 into the bore 28 of the wall 16, until the lip 38 of the tray 32 engages lower surface 64 of the web 24 of the housing 12. Alignment of the key 60 with the keyway 62 aligns the tray 32 with the opening 26 in the web 24, the opening 26 having a generally rectangular transverse plan configuration matching the plan configuration of cavity 34 of mold member 30. The configuration and plan dimensions of the opening 26 and the tray 32 match so that upon completing the insertion of the mold holder 50 into the bore 28 the opening 26 and the cavity 34 of the tray 32 are in precise registration. A retainer in the form of a lower end cap 70 is engaged with the second end 22 of the housing 12 and is advanced along the housing 12, as by complementary screw threads 72 and 74,.to couple the end cap 70 with the wall 16 of the housing 12 and secure the mold holder 50 in place, with the lip 38 of the tray 32 engaged with lower surface 64 of the web 24 of the housing 12. Together, the cavity 34 of the tray 32 and the opening 26 in the web 24 establish a compression chamber 80 having an upper end 82 adjacent the first end 20 of the housing 12 and a lower end 84 adjacent the mold holder 50, and an initial, predetermined volume between the ends 82 and 84.

As seen in FIG. 1, a mill-like processor 90 includes a sieve-like element in the form of mesh member 92 carried by a processor mount in the form of a frame 94 having a flange 96 for resting against upper surface 86 of the web 24 and a depending sleeve 98 (see FIG. 2) with a configuration and dimensions complementary to the opening 26 such that the sleeve 98 is received within the opening 26 and the flange 96 is seated against upper surface 86 of the web 24 to selectively mount the mesh member 92 in communication with the compression chamber 80. With the mesh member 92 held in communication with the compression chamber 80, as shown in FIG. 2, broken, unusable random-sized pieces 100 of make-up of the type ordinarily supplied in block form are placed within the sleeve 98 of the frame 94 and a trowel-like tool 102 is manipulated against the pieces 100 to force the pieces 100 against the mesh member 92, it thereby reducing the random-sized pieces 100, in a mill-like process, to intermediate particles 104 no larger than the mesh size of the mesh member 92 and passing intermediate particles 104 into the compression chamber 80 until the predetermined volume of the compression chamber 80 is filled to establish a charge 106 (see FIG. 3) having a measured volume of intermediate particles 104, as determined by the predetermined volume of the compression chamber 80.

Figure 3:
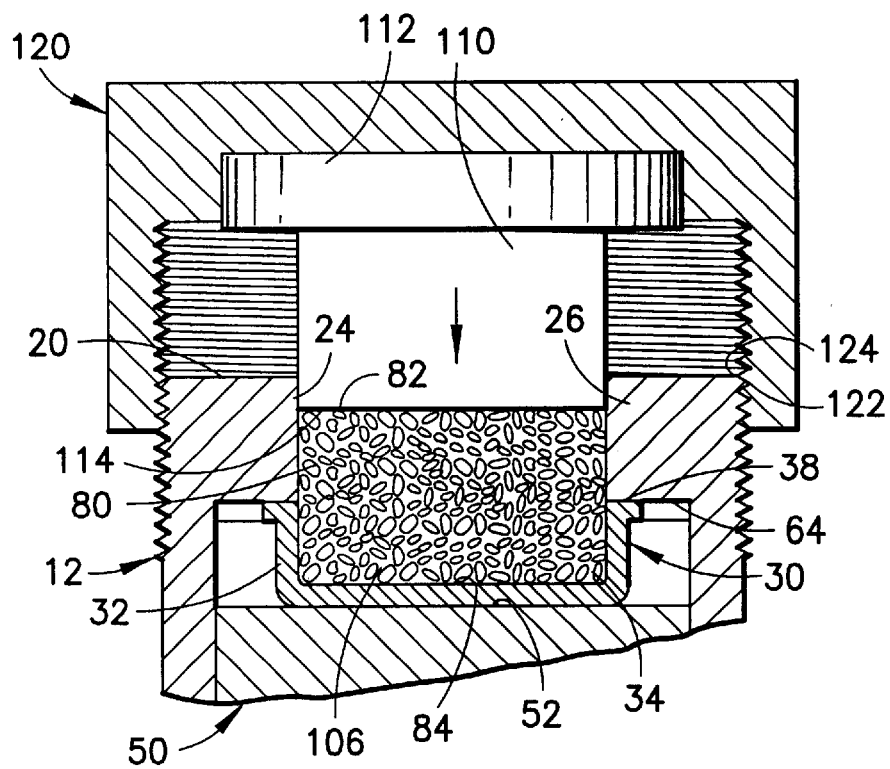
FIG. 3 is a fragmentary view of a portion of the apparatus and method of FIG. 2, illustrating another step of the method.
Figure 4:
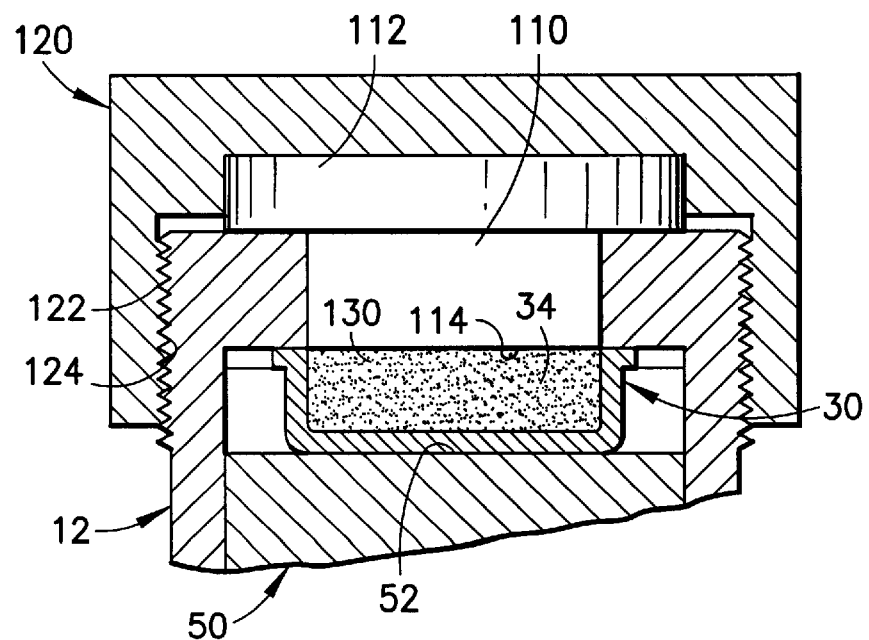
FIG. 4 is a fragmentary view similar to FIG. 3 and showing a further step in the method.

As illustrated in FIGS. 3 and 4, as well as in FIG. 1, the mesh member 92 subsequently is selectively removed from communication with the compression chamber 80 and a ram 110 is inserted into opening 26 to be advanced into compression chamber 80 and against the charge 106 of intermediate particles 104 which fills the prescribed volume of the compression chamber 80. The transverse cross-sectional configuration and dimensions of ram 110 are complementary with the corresponding configuration and dimensions of the opening 26 in the web 24 so that the ram 110 is received for sliding movement within the opening 26. A ram head 112 is integral with the ram 110, opposite remote end 114 of the ram 110, and a ram driver 120 selectively is engaged with the ram head 112 to move the ram 110 longitudinally into the opening 26 and advance the ram 110 into the compression chamber 80. Ram driver 120 selectively is coupled with the housing 12, adjacent the first end of the housing 12, as by complementary screw threads 122 and 124 which enable advancement of the ram driver 120 axially along the housing 12, with concomitant axial movement of the ram 110 into the compression chamber 80. The charge 106 of intermediate particles 104 in the compression chamber 80 is compressed by movement of the ram 110 into the compression chamber 80, the compression being assisted by operation of the screw threads 122 and 124. Compression of the charge 106 forces agglomeration of the intermediate particles 104 into a block 130 of prescribed consistency and size, as established by the measured volume of the charge 106 and the final volume of the compression chamber 80, which is the volume of the compression chamber 80 upon completion of the travel of the ram 110 in the direction from the first end 20 of the housing 12 toward the second end 22 of the housing 12, together with the dimensions of the compression chamber 80, upon reaching the final volume.

Effective agglomeration of the intermediate particles 104 into block 130 having the desired configuration and size is assured by the choice of a mesh size for mesh member 92 which forms intermediate particles 104 of appropriate size for effective agglomeration of the particular make-up being reclaimed. For typical block-type make-up currently available to consumers, a mesh size in the range of 4 to 600 mesh yields intermediate particle sizes which will agglomerate to establish the desired block of usable make-up. A preferred range of mesh size for most current make-up compositions ordinarily supplied in block form is 8 to 400 mesh, while a mesh size in the range of 10 to 240 mesh is most preferred for the higher quality block-type make-up cosmetic products now on the market.

Figure 5:
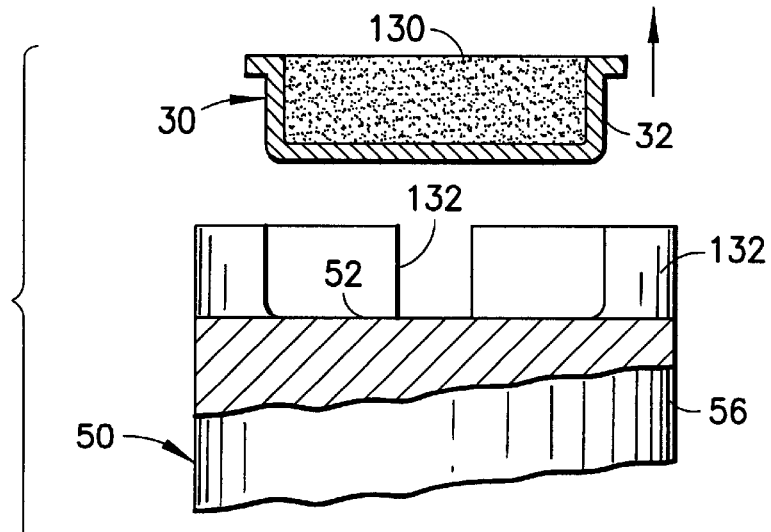
FIG. 5 is a fragmentary view similar to FIG. 4 and showing a still further step in the method.
Figure 6:
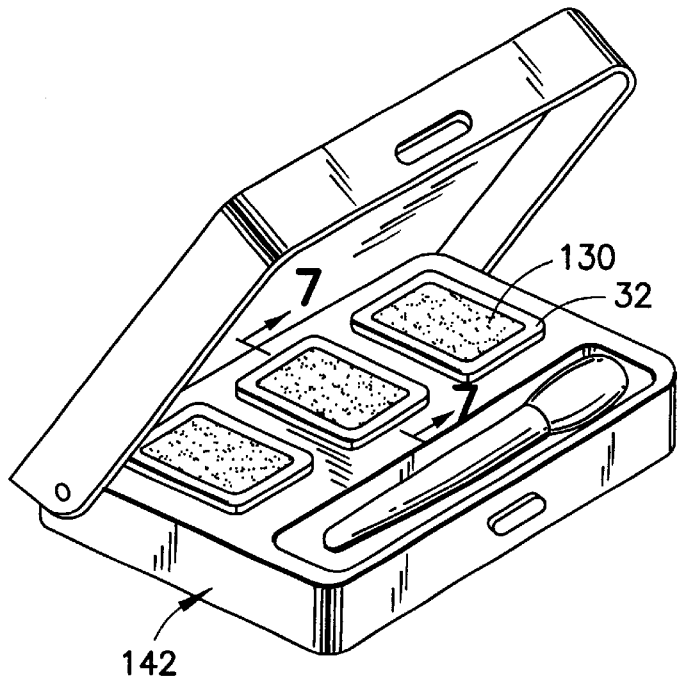
FIG. 6 is a pictorial perspective view illustrating the use of make-up reclaimed by the present invention.
Figure 7:
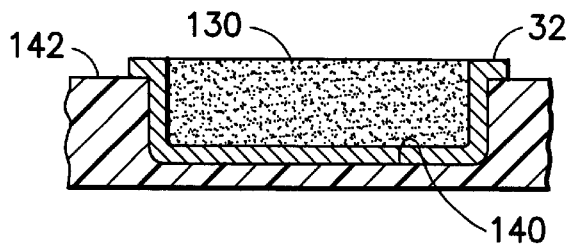
FIG. 7 is an enlarged cross-sectional view taken along line 7—7 of FIG. 6.

In the preferred arrangement illustrated in FIGS. 4 and 5, block 130 is formed directly in the cavity 34 provided by tray 32, with the size and configuration of the block 130 established by the size and configuration of cavity 34, and by the configuration of the end 114 of the ram 110. Tray 32 subsequently is removed readily from the mold holder 50 and the make-up of block 130 can be used directly from the tray 32. To that end, mold holder 50 includes access slots 132 which extend radially from the outer surface 56 of the mold holder 50 to the socket 52 so as to provide ready access to the tray 32 for selective removal of the tray 32 from the socket 52. Once removed, the tray 32, with the block 130 of reclaimed make-up, can be placed into a complementary receptacle 140 in a cosmetic case 142, as illustrated in FIGS. 6 and 7. Several trays 32 so placed within the cosmetic case 142 facilitates carrying reclaimed block-type make-up for regular use in the same manner as the original make-up.

It will be seen that the present invention attains the several objects and advantages summarized above, namely: Provides simplified apparatus and method enabling individual consumers to reclaim pieces of broken, unusable make-up of the type ordinarily supplied in block form with ease and economy; enables the ready processing by individuals of random-sized pieces of such make-up into usable blocks of prescribed uniformity and dimensions; enhances economy through salvaging previously unusable make-up for further use; allows greater latitude in the choice available to particular consumers concerned with the high cost of cosmetic products which are prone to becoming unusable when exposed to harmful conditions encountered in the field; provides increased versatility in the use of make-up of the type ordinarily supplied in block form in that greater variety is made available at more reasonable cost; requires only a minimal outlay for simplified, portable apparatus easily operated to conduct an effective process without the necessity for specialized tools and training; promotes the use of block-type make-up through reducing waste and concomitant expense; enables the reliable and effective reclamation of make-up which heretofore has been merely discarded as unusable.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Apparatus for reclaiming make-up ordinarily supplied in block form by processing broken, unusable random-sized pieces of such make-up into a block of usable make-up of prescribed consistency, size and configuration, the apparatus comprising:

a housing;

a compression chamber in the housing, the compression chamber having a first end and a second end, and a peripheral chamber wall extending longitudinally between the first and second ends;

a processor including a mesh member having a mesh size selected for reducing the random-sized pieces of make-up to intermediate particles no larger than the mesh size and capable of being agglomerated into the block of usable make-up of prescribed consistency;

a processor mount for mounting the mesh member on the housing for selective communication with the compression chamber to pass intermediate particles through the mesh member and into the compression chamber to establish a charge of intermediate particles in the compression chamber, and for selective removal from communication with the compression chamber;

a mold member having dimensions corresponding to the prescribed size and configuration of the block of usable make-up;

a mold holder for holding the mold member in the housing for selective communication with the compression chamber and for selective removal from communication with the compression chamber; and a ram movable longitudinally into the compression chamber, upon removal of the mesh member from communication with the compression chamber, for compressing the charge of intermediate particles passed from the mesh member into the compression chamber to agglomerate the intermediate particles of the charge into the block of usable make-up, with the block placed in the mold member.

2. The invention of claim 1 wherein the compression chamber has a predetermined initial volume for establishing a measured volume in the charge of intermediate particles, and a final volume for establishing the size and configuration of the block of usable make-up.

3. The invention of claim 1 wherein the mesh size of the mesh member is in the range of about 4 to 600 mesh.

4. The invention of claim 1 wherein the mesh size of the mesh member is in the range of about 8 to 400 mesh.

5. The invention of claim 1 wherein the mesh size of the mesh member is in the range of about 10 to 240 mesh.

6. The invention of claim 1 wherein:

the processor mount is located for mounting the mesh member adjacent the first end of the compression chamber;

the mold holder is located for holding the mold member adjacent the second end of the compression chamber; and the ram is movable into the compression chamber in a direction from the first end toward the second end of the compression chamber to compress the charge of intermediate particles into the block.

7. The invention of claim 1 wherein the mold member includes a tray, and the mold holder includes a tray mount for mounting the tray in the mold holder for selective release of the tray from the mold holder.

8. The invention of claim 7 including a tray receptacle for receiving the tray and retaining the tray during use of the make-up in the block.

9. The invention of claim 1 including a ram driver for engaging the ram to drive the ram into the compression chamber, and a coupling arrangement for coupling the ram driver with the housing for movement of the ram driver relative to the housing to advance the ram into the compression chamber.

10. The invention of claim 9 wherein the coupling arrangement includes complementary screw threads on the ram driver and the ram.

11. The invention of claim 1 including complementary screw threads on the mold holder and the housing for selective coupling and uncoupling of the mold holder and the housing.

12. The invention of claim 1 wherein:

the housing includes a generally tubular member;

the peripheral wall of the compression chamber extends axially along the tubular member and is generally tubular;

the processor mount selectively mounts the mesh member on the tubular wall such that the mesh member communicates with the compression chamber adjacent the first end of the compression chamber; and the mold holder selectively mounts the mold member on the tubular wall such that the mold member communicates with the compression chamber adjacent the second end of the compression chamber.

13. The invention of claim 12 including a ram driver for engagement with the ram, the ram driver being selectively coupled with the tubular member for movement along the tubular member to drive the ram into the compression chamber for compressing the intermediate particles into the block of usable make-up.

14. The invention of claim 13 including complementary screw threads for coupling the ram driver with the tubular member and driving the ram into the compression chamber.

15. The invention of claim 13 wherein the mold holder includes an end cap selectively coupled with the tubular member adjacent the second end of the compression chamber.

16. The invention of claim 15 including first complementary screw threads for selectively coupling the ram driver with the tubular member and driving the ram into the compression chamber, and second complementary screw threads for selectively coupling the end cap with the tubular member.

17. A method for reclaiming make-up ordinarily supplied in block form by processing broken, unusable random-sized pieces of such make-up into a block of usable make-up of prescribed consistency, size and configuration, the method comprising:

advancing the random-sized pieces of make-up into a processor juxtaposed with a compression chamber having first and second ends, the processor including a mesh member, the processor being mounted on a housing for selective communication with the compression chamber and for selective removal form communication with the compression chamber;

prior to advancing the random-sized pieces of make-up into the processor, selecting a mesh size for the mesh member for reducing the random-sized pieces of make-up to intermediate particles no larger than the mesh size and capable of being agglomerated into the block of usable make-up of prescribed consistency;

passing the intermediate particles from the processor into the compression chamber to establish a charge of intermediate particles;

advancing a ram into the compression chamber to compress the charge of intermediate particles into a mold member having a size and configuration corresponding to the prescribed size and configuration of the block of usable make-up so as to agglomerate the intermediate particles of the charge into the block of usable make-up, with the block placed in the mold member.

18. The invention of claim 17 wherein the compression chamber has a predetermined initial volume, and the charge of intermediate particles is provided with a measured volume by passing intermediate particles into the compression chamber until the initial volume is filled with intermediate particles.

19. The invention of claim 17 wherein the mesh size of the mesh member is in the range of about 4 to 600 mesh.

20. The invention of claim 17 wherein the mesh size of the mesh member is in the range of about 8 to 400 mesh.

21. The invention of claim 17 wherein the mesh size of the mesh member is in the range of about 10 to 240 mesh.

22. The invention of claim 17 including:

placing the mesh member in communication with the compression chamber prior to passing the intermediate particles from the processor into the compression chamber;

removing the mesh member from communication with the compression chamber subsequent to passing the intermediate particles from the processor into the compression chamber; and subsequently advancing the ram into the compression chamber to compress the charge of intermediate particles into the block.

23. The invention of claim 22 wherein the mesh member is placed at the first end of the compression chamber, and the ram is advanced through the first end of the compression chamber in a direction toward the second end of the compression chamber.

24. The invention of claim 22 including removing the mold member from the housing, with the block therein, and placing the mold member in a receptacle for subsequent use of the make-up in the block.

* * * * *